United States Patent
Wang et al.

(10) Patent No.: US 12,138,715 B2
(45) Date of Patent: Nov. 12, 2024

(54) SOLDER PASTE

(71) Applicant: Heraeus Deutschland Gmbh & Co. KG, Hanau (DE)

(72) Inventors: Lei Wang, Hanau (DE); Sebastian Fritzsche, Hanau (DE)

(73) Assignee: HERAEUS DEUTSCHLAND GMBH & CO. KG, Hanau (DE)

(*) Notice: Subject to any disclaimer, the term of this patent is extended or adjusted under 35 U.S.C. 154(b) by 183 days.

(21) Appl. No.: 17/756,875

(22) PCT Filed: Sep. 4, 2020

(86) PCT No.: PCT/EP2020/074721
§ 371 (c)(1),
(2) Date: Jun. 3, 2022

(87) PCT Pub. No.: WO2021/115644
PCT Pub. Date: Jun. 17, 2021

(65) Prior Publication Data
US 2023/0001520 A1  Jan. 5, 2023

(30) Foreign Application Priority Data
Dec. 10, 2019 (EP) .................................. 19214787

(51) Int. Cl.
| | |
|---|---|
| *B23K 35/36* | (2006.01) |
| *B23K 1/00* | (2006.01) |
| *B23K 35/02* | (2006.01) |
| *B23K 35/26* | (2006.01) |
| *B23K 35/365* | (2006.01) |
| *C22C 13/00* | (2006.01) |
| *B23K 101/36* | (2006.01) |

(52) U.S. Cl.
CPC ........ *B23K 35/3618* (2013.01); *B23K 1/0016* (2013.01); *B23K 35/025* (2013.01); *B23K 35/262* (2013.01); *B23K 35/365* (2013.01); *C22C 13/00* (2013.01); *B23K 2101/36* (2018.08)

(58) Field of Classification Search
None
See application file for complete search history.

(56) References Cited

U.S. PATENT DOCUMENTS

| | | | | |
|---|---|---|---|---|
| 2,715,084 A | * | 8/1955 | Konig ................ | B23K 35/3613 148/23 |
| 2,898,255 A | * | 8/1959 | Thompson ......... | B23K 35/3613 148/23 |
| 3,655,461 A | * | 4/1972 | Miwa .................... | B23K 35/34 106/1.27 |
| 6,592,020 B1 | | 7/2003 | Currie et al. | |
| 10,655,042 B2 | * | 5/2020 | Grinrod ................... | C09K 8/08 |
| 2003/0168123 A1 | | 9/2003 | Wada et al. | |
| 2007/0051774 A1 | | 3/2007 | Stipp et al. | |
| 2012/0291921 A1 | * | 11/2012 | Iwamura ............ | B23K 35/0222 148/23 |
| 2014/0084461 A1 | * | 3/2014 | Sidhu ................. | B23K 35/0244 257/738 |
| 2016/0311067 A1 | * | 10/2016 | Nachreiner ............ | H05K 1/181 |
| 2019/0061070 A1 | * | 2/2019 | Yamashita ........... | B23K 35/362 |
| 2022/0127445 A1 | * | 4/2022 | Kawasaki ............... | C08L 93/04 |

FOREIGN PATENT DOCUMENTS

| | | | | |
|---|---|---|---|---|
| CN | 101733588 A | 6/2010 | | |
| CN | 106255569 A | 12/2016 | | |
| DE | 102018112982 A1 | 12/2019 | | |
| EP | 1317991 A2 | 6/2003 | | |
| EP | 1897652 A1 | 3/2008 | | |
| EP | 2524763 A1 * | 11/2012 | ......... | B23K 35/3613 |
| EP | 2623253 A1 | 8/2013 | | |
| EP | 2886245 A1 | 6/2015 | | |
| EP | 3089844 A1 | 11/2016 | | |
| EP | 3098020 A1 | 11/2016 | | |
| EP | 3321025 A1 | 5/2018 | | |
| EP | 3335829 A1 * | 6/2018 | ........... | B23K 35/025 |
| ES | 2670524 * | 5/2018 | | |
| ES | 2670524 T3 * | 5/2018 | ......... | B23K 35/0222 |
| JP | 2004202518 A | 7/2004 | | |
| JP | 2008280478 A | 11/2008 | | |
| JP | 2016179496 A | 10/2016 | | |
| WO | 9821264 A1 | 5/1998 | | |
| WO | WO-2008085570 A3 * | 9/2008 | ......... | B23K 35/0244 |
| WO | 2015103362 A1 | 7/2015 | | |

OTHER PUBLICATIONS

Tolla, Bruno et al., "Chemical Influences on the Reliability of Complex Assemblies" (7 pages).
Tolla, Bruno et al., "Reactivity of No-Clean Flux Residues in Electronic Assemblies: A Systematic Study" (6 pages).

* cited by examiner

*Primary Examiner* — Devang R Patel
(74) *Attorney, Agent, or Firm* — Blank Rome LLP

(57) ABSTRACT

Solder paste consisting of 85 to 92% by weight of a tin-based solder and 8 to 15% by weight of a flux, wherein the flux comprises
i) 30 to 50% by weight, based on its total weight, of a combination of at least two optionally modified natural resins,
ii) 5 to 20% by weight, based on its total weight, of at least one low-molecular carboxylic acid; and
iii) 0.4 to 10% by weight, based on its total weight, of at least one amine, and
wherein the combination of the optionally modified natural resins has an integral molecular weight distribution of 45 to 70% by area in the molecular weight range of 150 to 550 and of 30 to 55% by area in the molecular weight range of >550 to 10,000 in the combined GPC.

20 Claims, No Drawings

SOLDER PASTE

CROSS REFERENCE TO RELATED APPLICATIONS

This application is a national stage of International Patent Application No. PCT/EP2020/074721, filed Sep. 4, 2020, which claims the benefit of EP Application No. 19214787.4, filed Dec. 10, 2019.

FIELD OF THE INVENTION

The present invention relates to a solder paste, in particular for attaching electronic components to substrates.

BACKGROUND OF THE INVENTION

Solder pastes, in particular soft solder pastes, are used primarily in the manufacture of electronic circuits and serve to produce a mechanical, electrical, and thermal connection between an electronic component and a substrate, more precisely between contact surfaces thereof provided for this purpose.

Examples of electronic components in the sense of the present patent application include diodes, LEDs (light-emitting diodes), dies, IGBTs (insulated-gate bipolar transistors, bipolar transistors with an insulated gate electrode), MOSFETs (metal-oxide-semiconductor field-effect transistors), ICs (integrated circuits), sensors, heat sinks, resistors, capacitors, coils, connecting elements (e.g., clips), base plates, antennas, and the like.

Examples of substrates in the sense of the present patent application include lead frames, PCBs (printed circuit boards), flexible electronics, ceramic substrates, metal-ceramic substrates, such as DCB substrates (direct copper-bonded substrates), IMS (insulated metal substrates), and the like.

The electronic component is usually brought into contact with or applied to the substrate via the solder paste. The solder paste is heated to melt the solder in the paste by a reflow process, thereby forming the contact between the electronic component and the substrate. After cooling and solidification of the solder, the electronic component and substrate are firmly connected to one another.

Solder pastes generally contain fluxes, which, among other things, serve to dissolve the oxide layer on the surfaces of the solder powder, of the component, and of the substrate, and to thus ensure better wettability during the soldering process. Since solder pastes are predominantly processed in screen and stencil printing in the automatic production of electronic circuits, the fluxes generally additionally contain substances, such as surfactants and additives, that improve the rheological properties of the flux and thus of the solder paste.

After the soldering process, solder residues originating from the flux remain on the electronic assemblies, which, in the case of so-called no-clean solder pastes, do not need to be removed from the soldered assemblies. However, there is a tendency toward electromigration and/or dendrite formation originating from the solder joints, leading to undesired shorts. Especially in the course of progressive miniaturization, the problem of electromigration and/or dendrite formation is becoming increasingly important due to the concomitantly increasing proximity of electronic components which must remain electrically insulated from one another.

DETAILED DESCRIPTION

The object of the invention is to provide a no-clean solder paste with reduced or no tendency toward electromigration and/or dendrite formation of solder joints formed therefrom.

The applicant has been able to develop a solder paste that achieves the object with a new, specially composed flux, which is characterized by the simultaneous presence of at least two natural resins which are in particular different from one another with regard to their average molecular weight ($M_w$) and may optionally be modified.

Accordingly, the invention consists in providing a solder paste consisting of 85 to 92% by weight (percent by weight) of a tin-based solder and 8 to 15% by weight of a flux, characterized in that the flux comprises
i) 30 to 50% by weight, based on its total weight, of a combination of at least two optionally modified natural resins,
ii) 5 to 20% by weight, based on its total weight, of at least one low-molecular carboxylic acid; and
iii) 0.4 to 10% by weight, based on its total weight, of at least one amine,
wherein the combination of the optionally modified natural resins has an integral molecular weight distribution of 45 to 70% by area in the molecular weight range of 150 to 550 and of 30 to 55% by area in the molecular weight range of >550 to 10,000 in the combined GPC (gel permeation chromatogram).

A GPC, including the mentioned combined GPC in the form of an integral molecular weight distribution, can be recorded in the usual manner known to the person skilled in the art, e.g., according to DIN 55672-1 (March 2016), using crosslinked polystyrene as immobile phase, tetrahydrofuran as liquid phase, and polystyrene standards, at a temperature of 23° C.

Unless otherwise noted, all standards cited in this patent application are in each case the current version at the time of the priority date.

The solder paste according to the invention comprises 85 to 92% by weight of a tin-based solder.

The term "tin-based solder" means a soldering alloy comprising at least 80% by weight, preferably at least 83% by weight, in particular 85 to 90% by weight of tin.

In a preferred embodiment, the soldering alloy comprises 0.1 to 8% by weight, preferably 0.2 to 6% by weight of silver, and/or 0.1 to 1.5% by weight, preferably 0.2 to 1% by weight of copper.

Further preferred is an embodiment in which the soldering alloy is lead-free.

Particularly preferably, the soldering alloy comprises or consists of tin and the aforementioned proportions of silver and copper.

It is preferred that the soldering alloy have a liquidus temperature in a range of 200 to 250° C., preferably in a range of 200 to 230° C.

In a preferred embodiment, the tin-based solder is present as solder powder, preferably with a weight-average particle size of 15 to 50 µm, preferably of 20 to 45 µm, determined according to IPC-TM-650 2.2.14.2.

The solder paste according to the invention comprises 8 to 15% by weight of a flux. This new flux comprised by the solder paste according to the invention itself in turn comprises, in each case based on its total weight, i) 30 to 50% by weight of a combination of at least two optionally modified natural resins, ii) 5 to 20% by weight of at least one low-molecular carboxylic acid, and iii) 0.4 to 10% by weight of at least one amine, wherein the combination of the optionally modified natural resins has an integral molecular weight distribution of 45 to 70% by area in the molecular weight range of 150 to 550 and of 30 to 55% by area in the molecular weight range of >550 to 10,000 in the combined GPC.

The flux comprises i) 30 to 50% by weight, based on its total weight, of a combination (mixture) of at least two optionally modified natural resins. For the person skilled in the art, it is not necessary to explain that "modified" stands for a chemical modification. The optionally modified natural resins may be unmodified or modified natural resins, e.g., natural resins modified by hydrogenation, dimerization, and/or esterification of their carboxyl groups. In particular, the natural resins are natural resins of the rosin resin type, i.e., unmodified or modified colophony resins, e.g., colophony resins modified by hydrogenation, dimerization, and/or esterification of their carboxyl groups.

As already mentioned, the combination of the at least two optionally modified natural resins has an integral molecular weight distribution of 45 to 70% by area in the molecular weight range of 150 to 550 and of 30 to 55% by area in the molecular weight range of >550 to 10,000 in the common GPC. In other words, the % by area in the molecular weight range of 150 to 550 and the % by area in the molecular weight range of >550 to 10,000 add up to 100% by area of the integral molecular weight distribution in the molecular weight range of 150 to 10,000. Below a molecular weight of 150 and above a molecular weight of 10,000, the combined GPC preferably has no signals for the at least two optionally modified natural resins.

The at least two optionally modified natural resins of said combination differ with regard to their average molecular weight $M_w$. Preferably, it is a combination of at least one optionally modified natural resin with an $M_w$ in the range of 150 to 550 and at least one optionally modified natural resin with an $M_w$ in the range of >550 to 10,000. The average molecular weights $M_w$ can be determined in the usual manner known to the person skilled in the art by means of GPC, e.g., according to DIN 55672-1 (March 2016, cross-linked polystyrene as an immobile phase, tetrahydrofuran as liquid phase, polystyrene standards, 23° C.).

The at least two optionally modified natural resins of said combination may, otherwise, differ with regard to their acid number (AN). In one embodiment, the optionally modified natural resin(s) with the higher $M_w$, e.g., with an $M_w$ in the range of >550 to 10,000, may have an acid number in, for example, the range of 1 to 50 mg KOH/g, and the optionally modified natural resin(s) with the lower $M_w$, e.g., with an $M_w$ in the range of 150 to 550, may have an acid number in, for example, the range of 180 to 280 mg KOH/g.

The term "acid number" used in this patent application relates to an acid number determinable in accordance with DIN EN ISO 2114 in mg KOH/g (milligrams KOH per gram).

As constituent ii), the flux comprises 5 to 20% by weight of at least one low-molecular carboxylic acid, preferably dicarboxylic acid. Examples include oxalic acid, adipic acid, malonic acid, succinic acid, glutaric acid, pimelic acid, suberic acid, azelaic acid, sebacic acid, undecanedioic acid, dodecanedioic acid, and tridecanedioic acid.

In one embodiment, the flux of the solder paste according to the invention has an acid number in the range of 85 to 145 mg KOH/g, based on the total flux. This total acid number of the flux results substantially from the acid contributions of constituents i) and ii).

As constituent iii), the flux comprises 0.4 to 10% by weight of at least one amine. Examples of amines include N,N,N',N'-tetramethylethylenediamine, N,N,N',N'-tetraethylethylenediamine, N,N,N',N'-tetrapropylethylenediamine, N-coco-1,3-diaminopropane, 1,6-diaminohexane, 1,7-diaminoheptane, 1,8-diaminooctane, 1,9-diaminononane, and 1,10-diaminodecane, bis(2-ethylhexyl)amine, bis(2-methylhexyl)amine, diethylamine, triethylamine, cyclohexylamine, diethanolamine, triethanolamine, hydrogenated tallow alkylamine, hydrogenated (tallow alkyl)dimethylamine, and hydrogenated bis(tallow alkyl)methylamine.

Furthermore, the flux may optionally comprise one or more thickening agents, e.g., in a proportion of a total of 1 to 5% by weight, preferably of 1.7 to 4.5% by weight. Examples include ethyl cellulose, hydrogenated castor oil, glycerol tris-12 hydroxystearin, and modified glycerol tris-12 hydroxystearin.

Furthermore, the flux may optionally comprise one or more organic solvents, e.g., in a proportion of a total of 32 to 46% by weight, preferably of 36 to 42% by weight. Examples include diols, alcohols, ether alcohols, and ketones that are liquid at 25° C., in particular trimethylpropanol, 1,2-octanediol, 1,8-octanediol, 2,5-dimethyl-2,5-hexanediol, isobornyl cyclohexanol, glycol ether, 2-ethyl-1,3-hexanediol, n-decyl alcohol, 2-methyl-2,4-pentanediol, terpineol, and isopropanol, and mixtures thereof. Examples of glycol ethers include mono-, di-, tripropylene glycol methyl ether, mono-, di-, tripropylene glycol n-butyl ether, mono-, di-, triethylene glycol n-butyl ether, ethylene glycol dimethyl ether, triethylene glycol methyl ether, diethylene glycol dibutyl ether, tetraethylene glycol dimethyl ether, and diethylene glycol monohexyl ether, and mixtures thereof.

Furthermore, the flux may optionally comprise one or more halogen-containing compounds, e.g., in a proportion of a total of 0.1 to 3% by weight, preferably 0.5 to 2% by weight. Examples include aniline hydrochloride, glutamic acid hydrochloride, diethanolamine hydrochloride, diethanolamine hydrobromide, triethanolamine hydrochloride, triethanolamine hydrobromide, and trans-2,3-dibromo-2-butene-1,4-diol.

The solder paste according to the invention preferably has a viscosity of 50 to 200 Pa·s, determined at 23° C. and at a shear rate of 10 s$^{-1}$, measured with a plate-cone rheometer (for example, the Anton-Paar company's Physica plate-cone rheometer).

A further subject matter of the present invention is a method for producing the solder paste according to the invention.

The method for producing the solder paste according to the invention comprises the steps of:
  mixing the constituents of the flux, in particular constituents i), ii) and iii); and
  adding a solder powder as mentioned above.

The addition of the solder powder is preferably carried out in several portions while stirring to form a presented mixture of the constituents of the flux, generally without heating.

The solder paste according to the invention can be used for connecting electronic components to substrates. It can also be used to produce solder deposits on substrates.

When connecting electronic components to substrates, the contact surface of the substrate and the contact surface of the electronic component are contacted via the solder paste according to the invention.

A method for attaching an electronic component to a substrate using the solder paste according to the invention may comprise the following steps:
  a) providing an electronic component having a contact surface,
  b) providing a substrate having a contact surface,
  c) providing the contact surface of the electronic component and/or the contact surface of the substrate with the solder paste according to the invention,
  d) contacting the contact surface of the electronic component with the contact surface of the substrate via the solder paste; and e) heating the solder paste above the liquidus temperature of the solder and subsequently allowing the solder to cool and solidify while forming a solid connection between the electronic component and the substrate.

Steps a) and b) are self-explanatory and require no further explanation.

In step c), the solder paste according to the invention can be applied to one or both contact surfaces by means of conventional methods known to the person skilled in the art, for example by means of screen or stencil printing.

In step d), the contact surfaces of the electronic component and of the substrate can be contacted to one another via the solder paste. In other words, a sandwich arrangement can be created from the electronic component and the substrate with the solder paste between the contact surfaces thereof.

In step e), the sandwich arrangement can be soldered by heating the solder paste to above the liquidus temperature of the solder so as to produce a firm connection between the electronic component and the substrate via the solder paste after subsequent cooling and solidification of the solder. In this case, the solder paste is preferably heated such that the solder transitions into its liquidus phase, without, however, damaging the solder paste, the electronic component, and/or the substrate. The sandwich arrangement or the solder paste is preferably heated to a temperature which is 5 to 60° C., preferably 10 to 50° C., above the liquidus temperature of the solder.

Electronic modules with electronic components and substrates soldered together according to the attachment method according to the invention have a significantly less frequent occurrence of short circuits. This desirable behavior is a consequence of a reduced or non-existent tendency toward electromigration and/or dendrite formation of the solder joints formed in the method according to the invention.

EXAMPLES

Test Methods Used:
1. Wetting Ability:

The wetting properties of solder pastes were assessed using the melting test according to IPC-TM-650 (1/95) test method 2.4.45. For this purpose, the solder pastes to be tested were applied to copper sheets (20 mm×20 mm×0.5 mm). If the copper sheets had an oxide layer on the surface, they were polished to the bare metal with P600 grade sandpaper and cleaned with alcohol. Copper sheets that had a bright and pure surface were cleaned only with alcohol. The prepared copper sheets were printed with the aid of a stencil. For this purpose, the stencil was pressed firmly onto the copper sheet so that the openings in the stencil were in the middle of the copper sheet. The solder paste to be tested was placed on a Japanese spatula and spread first lightly, and then with somewhat more pressure, over the openings in the stencil until there was no more solder paste left on the stencil. The stencil was then carefully removed to obtain the pattern given by the stencil. The printed copper sheet was placed for 2 minutes onto a first heating plate set at 200° C. to a temperature below the liquidus temperature of the solder and was then immediately placed onto a second heating plate with a temperature that was approx. 50° C. above the liquidus temperature of the solder (peak temperature). After the solder paste or solder had melted, the copper sheet was left on the heating plate for another 5 seconds and then removed and cooled.

After the solder paste had cooled down, an assessment was made as to whether it had melted into spots corresponding to the size of the openings in the stencil or into several small spots, and whether the solder paste had sharp edges after melting. It was assessed, furthermore, whether the surface was glossy or matte.

The solder pastes were divided into four classes, wherein classes 1 and 2 were classified as satisfactory results, while classes 3 and 4 represented unsatisfactory results:

Class 1: The re-melted area was greater than the area previously printed with solder paste.

Class 2: The re-melted area corresponded to the area previously printed with solder paste.

Class 3: The re-melted area was smaller than the area previously printed with solder paste (slight dewetting can be seen).

Class 4: The solder paste had formed one or more solder balls and had not wetted the copper sheet or was not fully melted.

2. Surface Insulation Resistance (SIR) Test, Corrosion Behavior of Solder Joints Test method according to J-STD-004B: 2011, with the following changes:

Printed circuit board according to IPC-B-24 with 200 μm line width and 200 μm distance between the lines, Ambient conditions: 65° C./93% relative humidity, 100 V corrosion voltage, 100 V measurement voltage, measurement frequency 60 minutes Test duration 1,000 h Two criteria were used for the evaluation of the SIR tests:

Criterion 1 (visually detectable dendrite formation): When viewed under an optical microscope with a magnification of 25×, a visual check was made as to whether or not dendrites had formed in the region of the soldered SIR conductor tracks.

Criterion 2 (hourly check for undesired shortfall of a resistance, representing a stability criterion, of >100 MΩ): Resistance measurements were carried out hourly over a total period of time of 1,000 h. The result of the SIR test was assessed as stable when all resistances measured over the period of time were >100 MΩ. In contrast, the result of the SIR test was assessed as unstable when one or more of the 1,000 measured values were <100 MΩ.

Table 1 shows the flux composition of comparative solder pastes 1 to 6 and solder pastes 7 to 13 according to the invention. The figures in each case refer to % by weight. In each case, 11 parts by weight of these fluxes were mixed in each case with 89 parts by weight of solder powder (SnAgCu: Sn 96.5% by weight, Ag 3.0% by weight, Cu 0.5% by weight, type 3 according to standard IPC J-STD-006) in order to form solder pastes. The properties of the solder pastes were determined by the methods described above and are also summarized in Table 1.

Table 1

TABLE 1

| | Flux | | | | | |
|---|---|---|---|---|---|---|
| | 1 | 2 | 3 | 4 | 5 | 6 |
| Modified rosin resin A, $M_w = 375$, AN = 240 mg KOH/g | 40 | 40 | | | 5 | 35 |

TABLE 1-continued

| | | | | | | |
|---|---|---|---|---|---|---|
| Modified rosin resin B, $M_w$ = 741, AN = 6 mg KOH/g | | | 40 | | | |
| Modified rosin resin C, $M_w$ = 372, AN = 10 mg KOH/g | | | | 40 | | |
| Tripropylene glycol n-butyl ether | 39.8 | 29.8 | 39.8 | 39.8 | 39.8 | 39.8 |
| Sebacic acid | 12 | 22 | 12 | 12 | 12 | 12 |
| N,N,N',N'-tetramethylethylenediamine | 2.1 | 2.1 | 2.1 | 2.1 | 2.1 | 2.1 |
| N-coco-1,3-diaminopropane | 2.1 | 2.1 | 2.1 | 2.1 | 2.1 | 2.1 |
| Hydrogenated castor oil | 4 | 4 | 4 | 4 | 4 | 4 |
| Total AN of the flux (mg KOH/g) | 162 | 217 | 70 | 71 | 81 | 150 |
| GPC area ratio*) | 95:5 | 95:5 | 10:90 | 88:12 | 21:79 | 84:16 |
| Wetting ability (class) | 4 | 2 | 3 | 3 | 3 | 2 |
| SIR (dendrite formation) | Yes | Yes | No | No | No | Yes |
| SIR (resistance > 100 MΩ) | Stable | Unstable | Unstable | Unstable | Unstable | Stable |

| | Flux | | | | | | |
|---|---|---|---|---|---|---|---|
| | 7 | 8 | 9 | 10 | 11 | 12 | 13 |
| Modified rosin resin A, $M_w$ = 375, AN = 240 mg KOH/g | 18 | 20 | 27 | 22 | 18 | 21.5 | 18 |
| Modified rosin resin B, $M_w$ = 741, AN = 6 mg KOH/g | 22 | 20 | 13 | 22 | 18 | 21.5 | 18 |
| Tripropylene glycol n-butyl ether | 39.8 | 39.8 | 39.8 | 39.8 | 39.8 | 39.5 | 40 |
| Sebacic acid | 12 | 12 | 12 | 8 | 16 | 12 | 12 |
| N,N,N',N'-tetramethylethylenediamine | 2.1 | 2.1 | 2.1 | 2.1 | 2.1 | 0.75 | 4 |
| N-coco-1,3-diaminopropane | 2.1 | 2.1 | 2.1 | 2.1 | 2.1 | 0.75 | 4 |
| Hydrogenated castor oil | 4 | 4 | 4 | 4 | 4 | 4 | 4 |
| Total AN of the flux (mg KOH/g) | 111 | 116 | 131 | 99 | 133 | 119 | 111 |
| GPC area ratio*) | 48:52 | 53:47 | 67:33 | 53:47 | 53:47 | 53:47 | 53:47 |
| Wetting ability (class) | 2 | 2 | 2 | 3 | 2 | 2 | 2 |
| SIR (dendrite formation) | No | No | No | No | Yes | No | No |
| SIR (resistance > 100 MΩ) | Stable | Stable | Stable | Stable | Unstable | Stable | Stable |

*)Area ratio of the molecular weight ranges 150 to 550/551 to 10,000 in the GPC of the rosin resin/in the combined GPC of the rosin resins

*) Area ratio of the molecular weight ranges 150 to 550/551 to 10,000 in the GPC of the colophony resin/in the combined GPC of the colophony resins

The invention claimed is:

1. A solder paste consisting of 85 to 92% by weight of a tin-based solder and 8 to 15% by weight of a flux, wherein the flux comprises:
   i) 30 to 50% by weight, based on the total weight of the flux, of a combination of at least two modified or unmodified colophony resins;
   ii) 5 to 20% by weight, based on the total weight of the flux, of at least one low-molecular carboxylic acid; and
   iii) 0.4 to 10% by weight, based on the total weight of the flux, of at least one amine, wherein
      at least one of the at least two colophony resins has an $M_w$ in the range of 150 to 550 and an acid number in the range of 180 to 280 mg KOH/g,
      at least one of the at least two colophony resins has an $M_w$ in the range of >550 to 10,000 and an acid number in the range of 1 to 50 mg KOH/g, and
      the combination of the colophony resins has an integral molecular weight distribution of 45 to 70% by area in the molecular weight range of 150 to 550 and of 30 to 55% by area in the molecular weight range of >550 to 10,000 in a combined gel permeation chromatogram (GPC).

2. The solder paste of claim 1, wherein the solder is a soldering alloy comprising at least 80% by weight of tin.

3. The solder paste of claim 2, wherein the soldering alloy has a liquidus temperature in a range of 200 to 250° C.

4. The solder paste of claim 1, wherein the colophony resins are unmodified colophony resins.

5. The solder paste of claim 1, wherein the combined GPC below a molecular weight of 150 and above a molecular weight of 10,000 has no signals for the at least two colophony resins.

6. The solder paste of claim 1, wherein the at least one low-molecular carboxylic acid is selected from the group consisting of oxalic acid, adipic acid, malonic acid, succinic acid, glutaric acid, pimelic acid, suberic acid, azelaic acid, sebacic acid, undecanedioic acid, dodecanedioic acid, and tridecanedioic acid.

7. The solder paste of claim 1, wherein the flux has an acid number in the range of 85 to 145 mg KOH/g, based on the total flux.

8. The solder paste of claim 1, wherein the at least one amine is selected from the group consisting of N,N,N',N'-tetramethylethylenediamine, N,N,N',N'-tetraethylethylenediamine, N,N,N',N'-tetrapropylethylenediamine, N-coco-1,3-diaminopropane, 1,6-diaminohexane, 1,7-diaminoheptane, 1,8-diaminooctane, 1,9-diaminononane, 1,10-diaminodecane, bis(2-ethylhexyl)amine, bis(2-methylhexyl)amine, diethylamine, triethylamine, cyclohexylamine, diethanolamine, triethanolamine, hydrogenated tallow alkylamines, hydrogenated (tallow alkyl)dimethylamines, and hydrogenated bis(tallow alkyl)methylamines.

9. The solder paste of claim 1, wherein the flux further comprises 1 to 5% by weight of one or more thickening agents and/or 32 to 46% by weight of one or more organic solvents and/or 0.1 to 3% by weight of one or more halogen-containing compounds.

10. A method for attaching an electronic component to a substrate, the method comprising:
 a) providing an electronic component having a contact surface,
 b) providing a substrate having a contact surface,
 c) providing the contact surface of the electronic component and/or the contact surface of the substrate with a solder paste according to claim 1,
 d) contacting the contact surface of the electronic component with the contact surface of the substrate via the solder paste; and,
 e) heating the solder paste above a liquidus temperature of the solder and subsequently allowing the solder to cool and solidify while forming a solid connection between the electronic component and the substrate.

11. The solder paste of claim 1, wherein the colophony resins are colophony resins modified by hydrogenation, dimerization, and/or esterification of their carboxyl groups.

12. The solder paste of claim 1, wherein the flux further comprises 1 to 5% by weight of one or more thickening agents, 32 to 46% by weight of one or more organic solvents, and 0.1 to 3% by weight of one or more halogen-containing compounds.

13. The solder paste of claim 1, wherein the solder paste has a viscosity of 50 to 200 Pa·s, wherein the viscosity is measured at 23° C. and a shear rate of 10 s$^{-1}$ with a plate-cone rheometer.

14. The solder paste of claim 2, wherein the soldering alloy comprises 0.1 to 8% by weight of silver and 0.1 to 1.5% by weight of copper.

15. The solder paste of claim 2, wherein the soldering alloy comprises 0.2 to 6% by weight of silver and 0.2 to 1% by weight of copper.

16. An electronic module, the electronic module comprising an electronic component and a substrate connected to each other by a solid connection, the solid connection formed from a solder paste according to claim 1.

17. A substrate for an electronic module, the substrate having a solder deposit on a surface thereof, the solder deposit formed from a solder paste according to claim 1.

18. A solder paste consisting of 85 to 92% by weight of a tin-based solder and 8 to 15% by weight of a flux, wherein the flux comprises:
 i) 30 to 50% by weight, based on the total weight of the flux, of a combination of at least two modified or unmodified colophony resins;
 ii) 5 to 20% by weight, based on the total weight of the flux, of at least one low-molecular carboxylic acid; and
 iii) 0.4 to 10% by weight, based on the total weight of the flux, of at least one amine, wherein
  the combination of the colophony resins has an integral molecular weight distribution of 45 to 70% by area in the molecular weight range of 150 to 550 and of 30 to 55% by area in the molecular weight range of >550 to 10,000 in a combined gel permeation chromatogram (GPC), and
  the flux has an acid number in the range of 85 to 145 mg KOH/g.

19. The solder paste of claim 18, wherein
 at least one of the at least two colophony resins has an $M_w$ in the range of 150 to 550 and an acid number in the range of 180 to 280 mg KOH/g, and
 at least one of the at least two colophony resins has an $M_w$ in the range of >550 to 10,000 and an acid number in the range of 1 to 50 mg KOH/g.

20. The solder paste of claim 19, wherein each of the at least two colophony resins are modified colophony resins.

* * * * *